United States Patent [19]
Bonis

[11] 3,993,810
[45] Nov. 23, 1976

[54] LAMINATED PLASTIC SHEETING AND CONTAINERS MADE THEREFROM

[76] Inventor: Laszlo J. Bonis, 50 Dinsmore Ave., Framingham, Mass. 01701

[22] Filed: Apr. 23, 1975

[21] Appl. No.: 570,587

[52] U.S. Cl. .................................. 428/35; 156/244; 229/3.5 R; 264/176 R; 428/212; 428/339; 428/519; 428/517
[51] Int. Cl.² ...................... B65D 11/00; B32B 7/00
[58] Field of Search ............ 428/35, 212, 419, 515, 428/517, 331, 339, 519; 264/171, 176 R, 79; 206/811, 484, 527; 229/3.5 R, 43; 156/244

[56] References Cited
UNITED STATES PATENTS

| 3,079,037 | 2/1963 | Schechter | 220/266 |
|---|---|---|---|
| 3,589,976 | 6/1971 | Erb | 428/515 |
| 3,809,602 | 5/1974 | Monia | 428/35 |
| 3,823,061 | 7/1974 | Frayer et al. | 264/171 |

OTHER PUBLICATIONS
Chemical Abstracts, vol. 82, 1975, p. 74, 18, 107t.

Primary Examiner—George F. Lesmes
Assistant Examiner—P. Thibodeau
Attorney, Agent, or Firm—George H. Gerstman

[57] ABSTRACT

Multi-layer, extruded plastic sheeting, and containers made therefrom are disclosed. The sheeting and containers comprise an outer layer of an acrylonitrile-containing vinylic polymer such as poly(acrylonitrile-butadiene-styrene) and a bonded inner layer of a solid hydrocarbon polymer, free of acrylonitrile groups, such as polystyrene. An intermediate layer between the two exposed inner and outer layers of the container may be utilized comprising poly(acrylonitrile-butadiene-styrene) of reduced acrylonitrile content to permit bonding of both the outer and inner layer to the intermediate layer.

9 Claims, 3 Drawing Figures

LAMINATED PLASTIC SHEETING AND CONTAINERS MADE THEREFROM

BACKGROUND OF THE INVENTION

Plastic sheeting made of acrylonitrile-containing polymers, and particularly poly(acrylonitrile-butadiene-styrene), are used to make cups and other containers which may be easily made from sheeting by thermo-forming, stamping, or the like. These cups and containers also exhibit a desirably low permeability to oxygen and water vapor, and as such are desirable for use as containers for food and beverage, among other uses.

However, recent concern has arisen with respect to the possibility that nitrile-containing materials can migrate into the contents of the container. This concern is particularly focused upon containers intended for food and beverages. At the same time, the well-known hydrocarbon polymers such as polystyrene are excessively permeable to oxygen and water vapor for many types of use, for example, for storing margarine or other perishable foods.

Accordingly, there is a need for a container which exhibits a low vapor permeability, and at the same time prevents the possible migration of nitrile-containing molecules into the contents of the container.

DESCRIPTION OF THE INVENTION

In accordance with this invention, a plastic container is provided, made of a multi-layer plastic sheet, which is typically co-extruded. The container comprises an outer layer of acrylonitrile-containing vinylic polymer, and a bonded, inner layer, defining the inner surface of the container, of a solid, relatively inert polymer, free of acrylonitrile groups. Typically, the inner layer is crystalline polystyrene, which is commercially available, for example, from Cosden Oil and Chemical Company of New York City.

The outer layer is most preferably poly(acrylonitrile-butadiene-styrene) typically containing from about 20 to 40 percent by weight of acrylonitrile units, and desirably about 25 to 30 percent, to provide the container of this invention with an appropriate degree of oxygen and water vapor impermeability.

Accordingly, the containers of this invention may be vapor impermeable, while at the same time the inner layer of the container is free of nitrile radicals, to provide assurance that there will be no nitrile migration into the contents of the container.

In order to forstall compatibility problems between the inner and outer layers described above, which may result in weak bonding between the two layers, it is preferred to provide an intermediate layer between the aforesaid inner and outer layers of the plastic container made of poly(acrylonitrile-butadiene-styrene) in which the acrylonitrile content is less than that of the outer layer, and typically from about 10 to 20 percent by weight (and preferably about 10 to 15 percent by weight). This intermediate layer is compatible with many polymers used as the inner layer such as polystyrene, to provide a strong bond between the inner layer of the container and the intermediate layer. It can also be compatible with poly(acrylonitrile-butadiene-styrene) terpolymers which have more than 20 percent by weight of acrylonitrile units, as is preferably the case with respect to the outer layer of the containers of this invention, so that excellent bonding is also achieved in the interface between the outer layer and the intermediate layer.

The solid, relatively inert polymers which are used herein as the inner surface-defining layer may not only be polystyrene, but may be other hydrocarbon resins such as polyethylene or polypropylene. Other relatively inert polymers may also be used, such as polyvinyl acetate, and Serlyn, which is an ionomer manufactured by the Du Pont Chemical Company.

Figure 1:
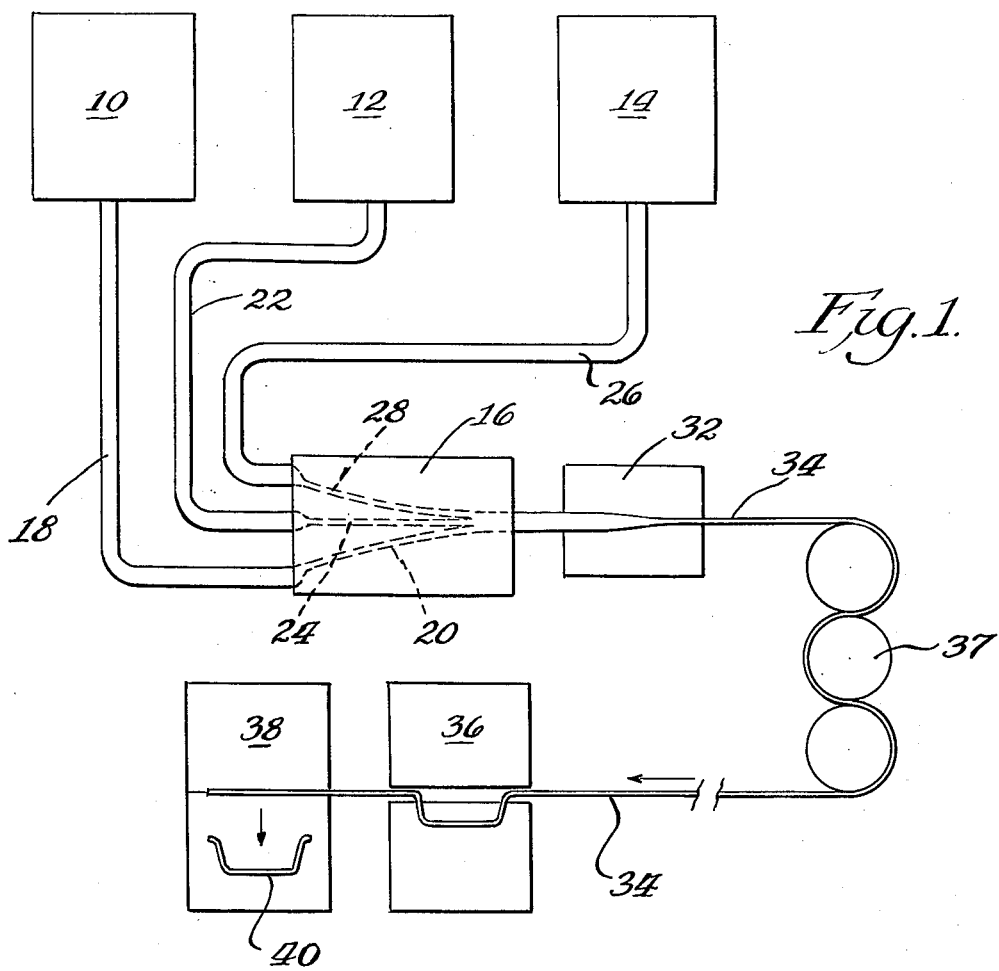
FIG. 1 is a schematic diagram of a typical manufacturing process for margarine tubs or other food containers made in accordance with this invention.

Referring to FIG. 1, heating vessels 10, 12 14 are provided as sources of the separate plastic formulations used in the specific process shown, for manufacture of containers of this invention.

Heated container 10 serves as a source of crystalline polystyrene (for example Cosden 550, sold by the Cosden Oil and Chemical Company), heated to about 400° F. to be flowable through co-extrusion block 16. Conduit 18 communicates between container 10 and co-extrusion block 16, and is connected to channel 20 of the co-extrusion block 16.

Heated container 12 communicates through conduit 22 to the middle channel of co-extrusion block 24, and contains poly(acrylonitrile-butadiene-styrene) having an acrylonitrile content of about 13 percent by weight (for example Dow ABS 300, manufactured by the Dow Chemical Company of Midland, Michigan). The poly(acrylonitrile-butadiene-styrene) is provided to co-extrusion block 16 at a temperature of about 415° F.

Heated container 14 communicates by means of conduit 26 to the third channel 28 of co-extrusion block 16. In this specific embodiment, container 14 may supply molten poly(acrylonitrile-butadiene-styrene) having about a 27 percent by weight acrylonitrile content, (available, for example, from the Monsanto Chemical Company as Monsanto LP 74), and may be supplied to co-extrusion block 28 at a temperature of about 415° F.

The three channels 20, 24, 28 in co-extrusion block 16 merge together to form under pressure a unitary, three-layered, thick stream of generally circular or rectilinear cross-section, which contains polystyrene on one side thereof and poly(acrylonitrile-butadiene-styrene) on the other side thereof. Stream 30 passes into extrusion die 32, while maintained at a temperature of about 400° F. or slightly in excess thereof, for extrusion into multi-layer sheeting web 34.

Sheeting web 34 passes through a series of conventional chill rolls 37, after which the cooled sheeting web may be immediately processed into containers as desired, or it may be rolled on spools for storage, (not shown).

When it is desired to manufacture containers made from the sheeting web 34, the process, as schematically illustrated by FIG. 1, is continued by passing sheeting web 34 through a conventional thermo-forming apparatus 36, in which sheeting web 34 is impressed with a large number of shapes corresponding to the containers to be produced in accordance with this invention. Thereafter, the shaped web 34 passes into a trim press 38, in which the individual containers 40 are separated from sheet 34.

Thereafter, if desired, the containers 40 (FIG. 2) may be processed in a conventional curling machine, to be provided with a curled lip 42, for receiving a separately prepared cover 44 in snap-fit relation, for tight, hermetically sealed storage of margarine or the like in the containers. Cover 44 may also be made from sheeting web 34, or other plastic sheeting as desired.

Figure 3:
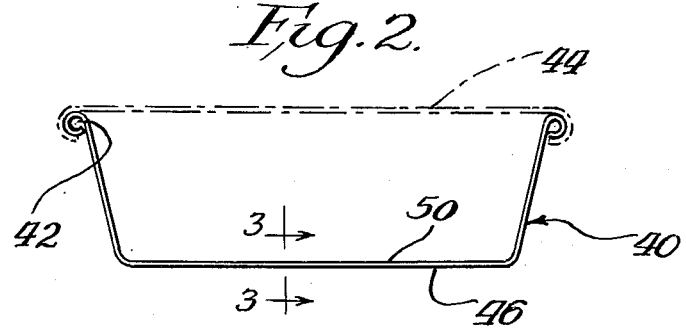
FIG. 3 is a greatly enlarged, sectional view taken along line 3—3 of FIG. 2.

FIG. 3 is a greatly enlarged cross-section of a portion of container 40. FIG. 3 can also represent a similar, greatly enlarged cross-section of sheeting web 34 from which container 40 is made. As illustrated, container 40 comprises three bonded layers: an outer, surface-defining layer 46 of the poly(acrylonitrile-butadiene-styrene) provided through channel 28 to the co-extrusion block. A middle layer 48 is defined by the poly(acrylonitrile-butadiene-styrene) provided to channel 24 of block 16. Layer 48 is bonded to inner surface-defining layer 50, which is made of the polystyrene supplied through channel 20, and is also bonded to layer 46.

Figure 2:
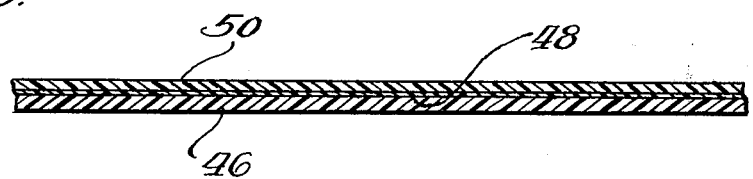
FIG. 2 is a cross-sectional, enlarged view of a margarine tub manufactured in accordance with the method of FIG. 1.

The flow of plastic through channels 20, 24 and 28 may be controlled, relative to each other and to the velocity of sheeting web 34 on the production line, to provide to layer 46 a thickness of about 0.02 to 0.03 inch e.g. about 0.025 inch; a thickness to layer 48 of about 0.001 to 0.005 inch, e.g. 0.003 inch; and a thickness to layer 50 of about 0.001 to 0.01 inch, preferably about 0.005 inch. The specific and preferred thicknesses have been found to provide a container in which lip 42 can be easily curled as shown in FIG. 2 in conventional curling machinery, while the resulting container is strong, inexpensive, and vapor impermeable. The resulting container also provides a barrier to the possible migration of residual free acrylonitrile into the contents thereof.

The above has been offered for illustrative purposes only, and is not for the purpose of limiting the scope of the invention of this application, which is as defined in the claims below.

That which is claimed is:

1. In a plastic container having outer and inner surfaces and made of a bonded, multi-layer plastic sheet, the improvement comprising: an outer surface-defining layer of a poly(acrylonitrile-butadiene-styrene) containing from 20 to 40 percent by weight of acrylonitrile units; and an inner surface-defining layer of a solid, relatively inert polymer free of acrylonitrile units, to prevent nitrile migration into the contained product; and a bonded, intermediate layer, disposed between said outer and inner surface-defining layers, comprising poly(acrylonitrile-butadiene-styrene) having from 10 to 20 percent by weight of acrylonitrile units and fewer acrylonitrile units than said outer surface-defining layer.

2. The plastic container of claim 1 in which said inner surface-defining layer is polystyrene.

3. The plastic container of claim 2 in which said outer surface-defining layer contains about 27 percent by weight of acrylonitrile units and is from 0.02 to 0.03 inch in thickness; said intermediate layer contains about 13 percent by weight of acrylonitrile units and is about 0.001 to 0.005 inch in thickness; and said inner surface-defining layer is from 0.001 to 0.01 inch in thickness.

4. The plastic container of claim 3 in which said inner layer is about 0.005 inch in thickness.

5. Co-extruded plastic sheeting comprising a first, outer layer of poly(acrylonitrile-butadiene-styrene) containing from 20 to 40 percent by weight of acrylonitrile units; an intermediate layer of poly(acrylonitrile-butadiene-styrene) containing from 10 to 20 percent by weight of acrylonitrile units, and fewer acrylonitrile units than said first, outer, layer, and a second, opposite outer layer of polystyrene, said first and said second outer layers being bonded to said inner layer.

6. The plastic sheeting of claim 5 in which said first, outer layer is from 0.02 to 0.03 inch in thickness, said intermediate layer is about 0.001 to 0.005 inch in thickness, and said second, opposite outer layer is about 0.001 to 0.01 inch in thickness.

7. The method of simultaneously extruding a first plastic sheet comprising poly(acrylonitrile-butadiene-styrene) containing from 20 to 40 percent by weight of acrylonitrile units; a second plastic sheet of poly(acrylonitrile-butadiene-styrene) containing from 10 to 20 percent by weight of said acrylonitrile units, and fewer acrylonitrile units than said first sheet; and a third plastic sheet of a relatively inert polymer free of acrylonitrile units; and pressing said sheets into unitary, overlying relationship with each other, with said second sheet being positioned between said first and third sheets, while said sheets are in heat-softened condition, to create a unitary, coextruded member from said three sheets.

8. The method of claim 7 in which said third sheet is made of polystyrene.

9. The method of claim 8 in which said coextruded member is thereafter impressed to form a plurality of cup-like members from said coextruded member.

* * * * *